US012553582B2

(12) United States Patent
Jiang et al.

(10) Patent No.: US 12,553,582 B2
(45) Date of Patent: Feb. 17, 2026

(54) ELECTRONIC CANDLE IN DUAL-CONTROL MODE

(71) Applicant: Yanyu Jiang, Ningbo (CN)

(72) Inventors: Yanyu Jiang, Ningbo (CN); Changkui Wu, Ningbo (CN)

(73) Assignee: Yanyu Jiang, Ningbo (CN)

( * ) Notice: Subject to any disclaimer, the term of this patent is extended or adjusted under 35 U.S.C. 154(b) by 0 days.

(21) Appl. No.: 18/804,151

(22) Filed: Aug. 14, 2024

(65) Prior Publication Data

US 2025/0093003 A1 Mar. 20, 2025

(30) Foreign Application Priority Data

Sep. 20, 2023 (CN) ......................... 202322562674.8

(51) Int. Cl.
*F21S 6/00* (2006.01)
*F21S 10/04* (2006.01)
*F21V 23/04* (2006.01)

(52) U.S. Cl.
CPC .......... *F21S 6/001* (2013.01); *F21V 23/0485* (2013.01); *F21S 10/04* (2013.01); *F21V 23/04* (2013.01)

(58) Field of Classification Search
CPC ........ F21S 6/001; F21S 10/04; F21V 23/0485
See application file for complete search history.

(56) References Cited

U.S. PATENT DOCUMENTS

| | | | | |
|---|---|---|---|---|
| 9,605,824 B1 * | 3/2017 | Li | H05B 47/12 | |
| 11,788,697 B1 * | 10/2023 | Chen | F21S 10/04 | 362/157 |
| 11,879,615 B1 * | 1/2024 | Guo | F21V 23/003 | |
| 2008/0151563 A1 * | 6/2008 | Chen | F21V 23/0442 | 431/125 |
| 2014/0035483 A1 * | 2/2014 | Becker | F21S 9/02 | 362/184 |
| 2016/0057829 A1 * | 2/2016 | Li | F21K 9/232 | 315/313 |
| 2016/0161071 A1 * | 6/2016 | Jean | F21S 6/001 | 362/183 |
| 2017/0307159 A1 * | 10/2017 | Li | F21S 9/02 | |
| 2017/0311404 A1 * | 10/2017 | Li | F21S 10/046 | |
| 2018/0038565 A1 * | 2/2018 | Li | H05B 47/12 | |
| 2018/0094785 A1 * | 4/2018 | Li | F21S 9/02 | |
| 2018/0283633 A1 * | 10/2018 | Roberts | H05B 47/155 | |
| 2019/0032904 A1 * | 1/2019 | Wang | F21S 6/001 | |
| 2021/0048173 A1 * | 2/2021 | Li | F21S 10/046 | |
| 2024/0044466 A1 * | 2/2024 | Li | F21V 21/22 | |

FOREIGN PATENT DOCUMENTS

| | | | |
|---|---|---|---|
| DE | 202024104549 U1 * | 10/2024 | F21S 6/001 |
| KR | 20100086529 A * | 8/2010 | F21S 6/001 |

* cited by examiner

*Primary Examiner* — Alexander K Garlen
(74) *Attorney, Agent, or Firm* — Jose Cherson Weissbrot

(57) ABSTRACT

An electronic candle with a dual-control mode comprises a base, an outer shell and a simulated flame head with a first luminous body, wherein the outer shell is arranged on the base, the simulated flame head is exposed at the top of the outer shell. The base is provided with a battery capable of supplying power to the first luminous body and a PCB board for control. The simulated flame head is provided with a touch switch exposed for people to touch, and the touch switch, the first luminous body, the battery and the PCB board are electrically connected together to form a control loop.

15 Claims, 6 Drawing Sheets

ELECTRONIC CANDLE IN DUAL-CONTROL MODE

CROSS-REFERENCE TO RELATED APPLICATIONS

This application claims the priority of China Patent Application No. 20232253662.8 filed on Sep. 18, 2023, entitled “Simulated Candle Lamp with Touch Sensing Function”, and all the contents of the above application and amendments thereof are incorporated herein by reference.

This application claims the priority of China Patent Application No. 202322562674.8 filed on Sep. 20, 2023, entitled “Electronic Candle in Double Control Mode”, and all the contents of the above application and amendments thereof are incorporated herein by reference.

TECHNICAL FIELD

The present invention relates to the technical field of electronic candles, in particular to an electronic candle with a dual-control mode.

BACKGROUND TECHNOLOGY

At present, in some specific circumstances, in order to reduce fire hazards, carbon dioxide emissions, ease of use as well as safety and other purposes, real candles are usually not used, but electronic simulated candles with similar shapes are used. LED lamps are used as light sources in the electronic simulated candles, which not only have lighting functions, but also can be designed with ornamental and entertainment functions, such as electronic flash candles, music candles and simulated kerosene lamps.

For example, the China utility model patent No. 2019202975042 (announcement No. CN209262910U) has disclosed an electronic candle, which comprises a tubular simulated candle body, an inner cover with a hollow simulated flame, a control switch, a resistor, an LED flashing light and a battery. The LED flashing light is installed in the hollow position of the simulated flame, and two connected battery tubes are fixed on the bottom plate of the tubular simulated candle body. Compression springs for connecting with battery electrodes are fixed at the bottom of the battery tubes, upon which the two compression springs are connected. It further comprises a PCB board. The control switch, the resistor and the LED flashing light are welded on the PCB board. The bottom of the PCB board is provided with contacts respectively positioned above the two battery tubes for connecting with the battery electrodes. The PCB board is fixedly connected with the bottom of the inner cover.

In addition, the China utility model patent with a patent number of 2019204024003 (with a publication number of CN209386167U) also discloses an electronic simulated flame head and electronic simulated candle, which comprises a simulated flame head body, wherein a first luminous body is encapsulated in the simulated flame head body, and the first luminous body comprises a carrier and a plurality of LED chips electrically connected with a control chip, and the plurality of LED chips are distributed on one side of the carrier, and when energized, the control chip controls the LED chip to partially or completely light up on the simulated flame head body to reveal a dynamic flame burning effect.

In above patents, there were some areas for improvement. The power switches of the electronic candle are all arranged on the bottom surface of the base. In normal use, the electronic candles need to be picked up as a whole to operate, which is troublesome to use. Moreover, because the candle body is waxy, users will feel greasy after taking it, which will affect the experience.

Therefore, there is a need to propose a new type of electronic candle, which is easy to operate and not easy to contaminate the grease on the wax skin.

SUMMARY

The terms “invention,” “the invention,” “this invention” and “the present invention” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides an electronic candle in a dual-control mode to solve the problems that the existing electronic candle switch is troublesome to operate, described in the background technology.

In order to achieve the above objective, the present invention adopts the following technical solutions:

An electronic candle with a dual-control mode includes a base, an outer shell and a simulated flame head with a first luminous body, wherein the outer shell is arranged on the base, the simulated flame head is exposed at a top of the outer shell, and a battery capable of supplying power to the first luminous body and a PCB board for control are mounted on the base. The simulated flame head is provided with a touch switch exposed for people to touch. The touch switch, the first luminous body, the battery and the PCB board are electrically connected together to form a control loop, and whether the first luminous body of the simulated flame head emits light or not is controlled by touching the touch switch.

The present invention further provides an electronic candle with a dual-control modes, which includes a base, an outer shell and a simulated flame head, wherein a first luminous body is arranged in the simulated flame head, and a second luminous body located in the outer shell is also arranged on the base. And an exposed touch switch is arranged on the simulated flame head, and the touch switch is touched by people and controls whether the first luminous body and the second luminous body emit light or not. And the base is provided with a toggle switch, and the toggle switch controls the on-off of the circuit of the touch switch, the first luminous body and the second luminous body.

The present invention further provides an electronic candle with a dual-control modes, which includes a base, an outer shell and a simulated flame head, wherein the simulated flame head comprises a first luminous body, a connecting sleeve, a simulated hood and a touch switch, wherein the touch switch controls whether the first luminous body emits light or not. And the first luminous body and the touch switch are both arranged on the connecting sleeve, the simulated hood is sleeved on the connecting sleeve and surrounds the outside of the first luminous body, and a peripheral wall of the touch switch is exposed between the simulated hood and the connecting sleeve. And an inner side wall of the touch switch extends inward to form a connecting part, and the connecting sleeve is provided with a placing groove for accommodating the connecting part and is used for circumferential positioning and limiting of the touch switch.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
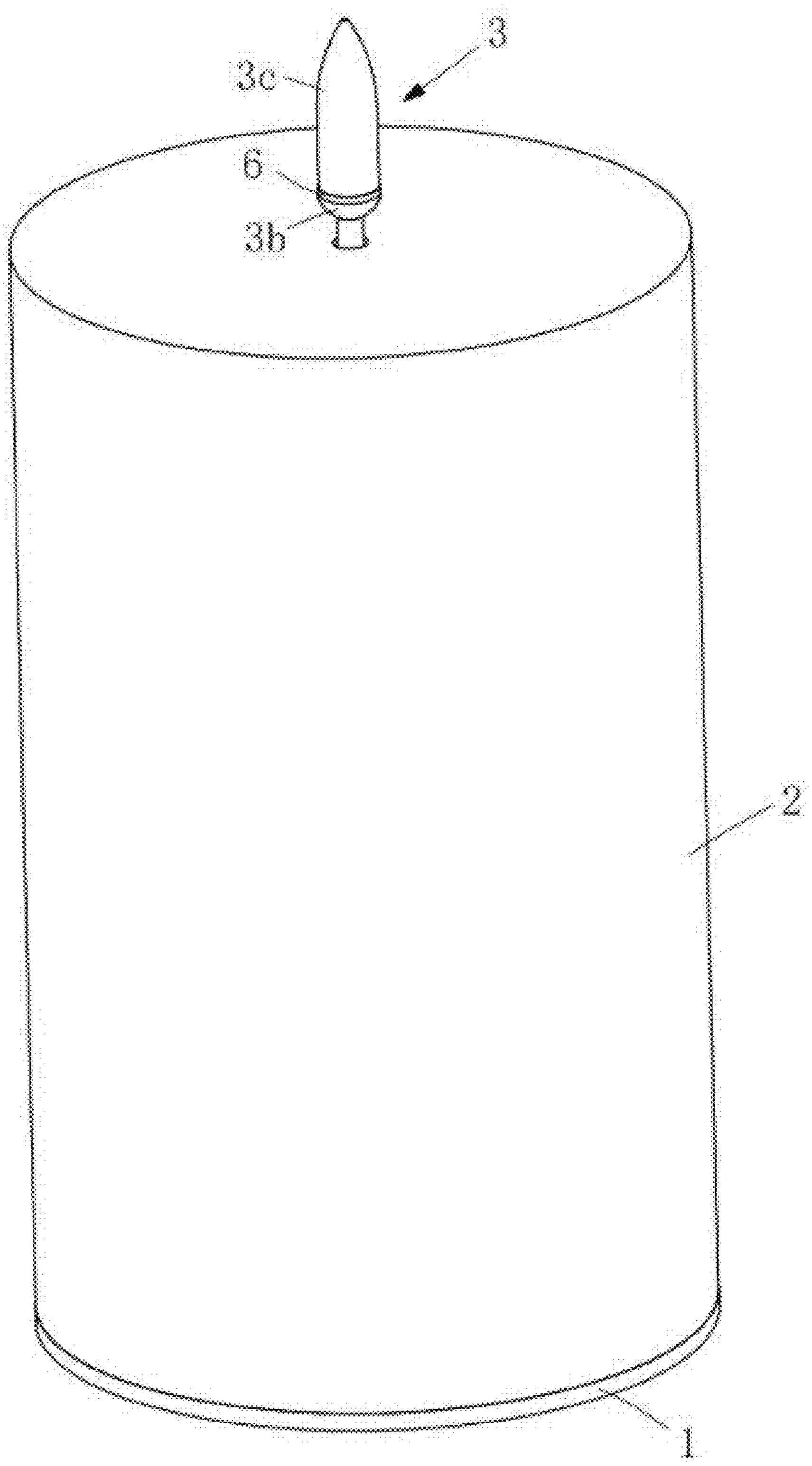
FIG. 1 is a schematic diagram of the three-dimensional structure of the present invention.

Reference signs: Base (1); Outer shell (2); Simulated flame head (3); First luminous body (3*a*); Connecting sleeve (3*b*); Step surface (3*b*1); Placing groove (3*b*2); Wire conduit (3*b*3); Simulated hood (3*c*); Battery (4); PCB board (5); Touch switch (6); Connecting part (6*a*); Wire (6*b*); Second luminous body (7); Toggle switch (8).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1-6, it is the best embodiment of the utility model. The electronic candle with a dual-control mode in this embodiment mainly includes a base 1, an outer shell 2, a simulated flame head 3, a battery 4, a PCB board 5, a touch switch 6 and a toggle switch 8. Wherein the outer shell 2 is wax.

Figure 2:
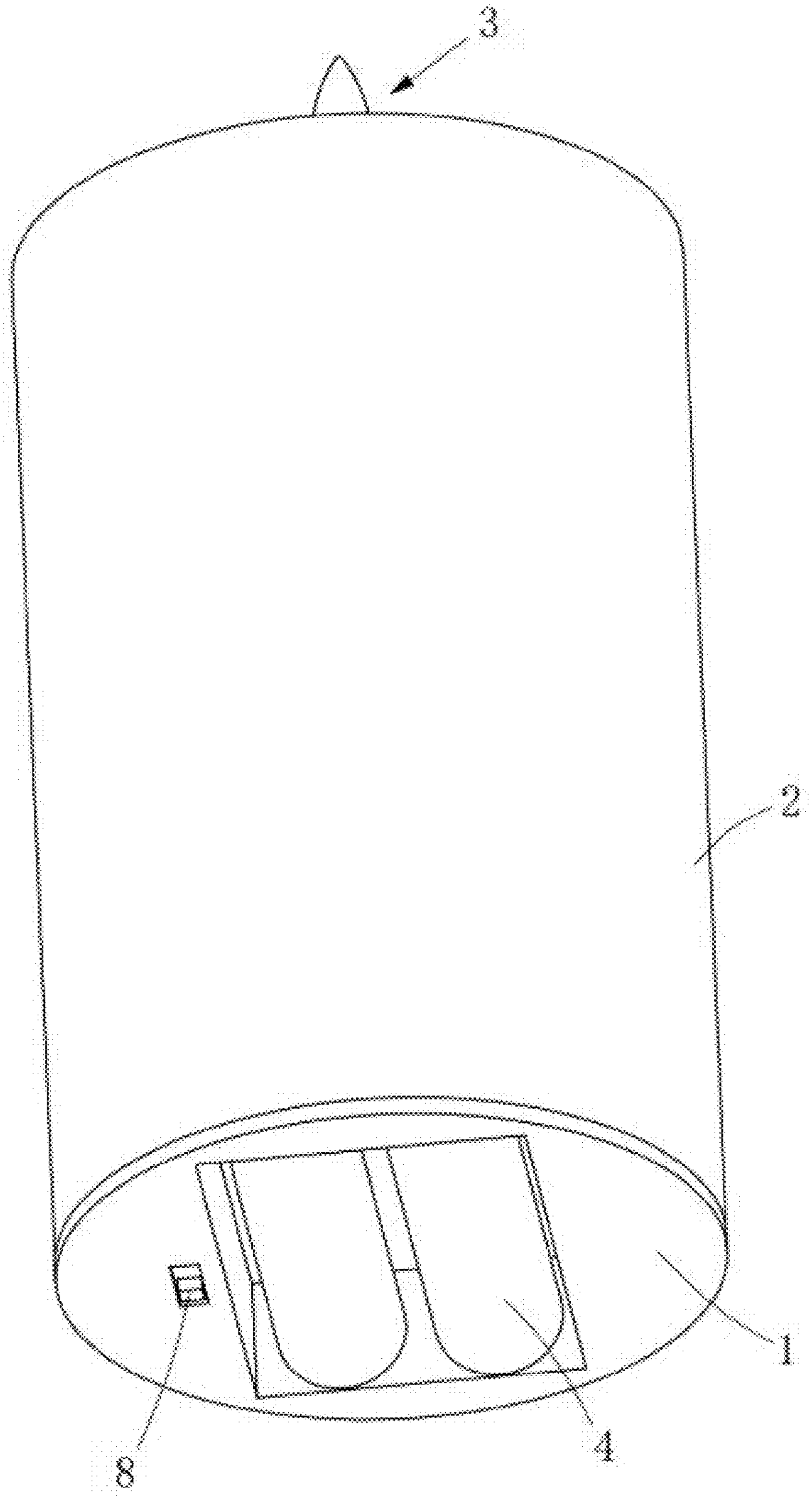
FIG. 2 is a schematic diagram of the three-dimensional structure of the bottom view angle of the present invention.
Figure 3:
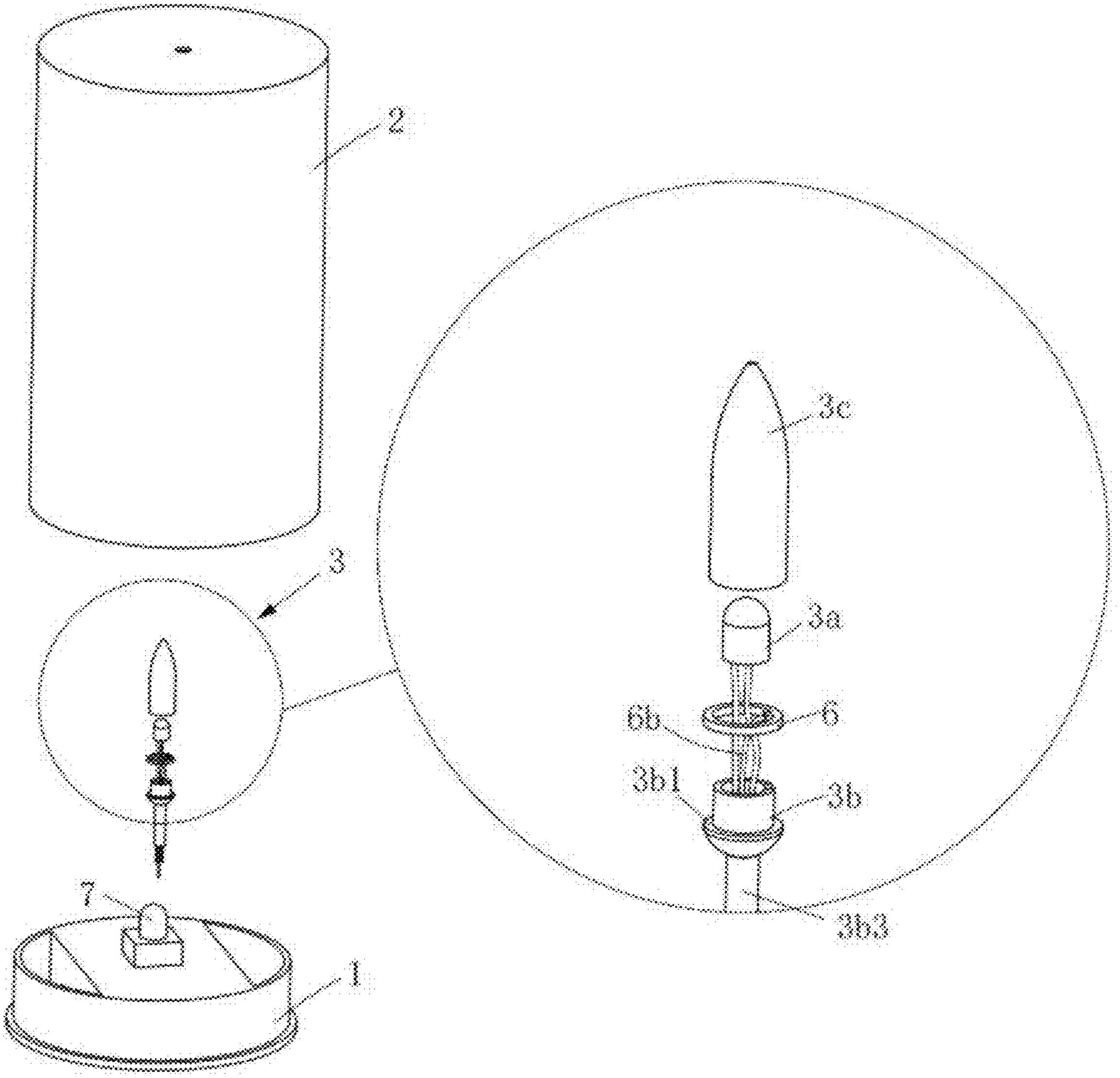
FIG. 3 is an enlarged schematic view of part A of FIG. 4 in the present invention.

As shown in FIG. 2 to FIG. 3, the outer shell 2 is arranged on the base 1, and the simulated flame head 3 is exposed at the top of the outer shell 2. The simulated flame head 3 has a first luminous body 3*a* that can emit light. The base 1 is provided with a power supply 4 that can supply power to the first luminous body 3*a* and a PCB board 5 for control. The simulated flame head 3 is provided with a touch switch 6 that is exposed for people to touch. The touch switch 6, the first luminous body 3*a*, the power supply 4 and the PCB board 5 are electrically connected to form a control loop, and whether or not the first luminous body 3*a* of the simulated flame head 3 emits light is controlled by touching the touch switch 6.

It should also be noted that the operating principle of the touch switch 6 in this embodiment is the same as that of the capacitive touch switch in the prior art, and thus will not be described in detail in this embodiment.

In order to facilitate the installation of the first luminous body 3*a* and the touch switch 6 in this embodiment, as shown in FIGS. 2 to 5, in this embodiment, the simulated flame head 3 further includes a connecting sleeve 3*b*, a wire conduit 3*b*3 and a simulated hood 3*c*. The connecting sleeve 3*b* is connected to the outer shell 2 through the wire conduit 3*b*3, and the first luminous body 3*a* is arranged on the connecting sleeve 3*b*, and the touch switch 6 is also arranged on the connecting sleeve 3*b*.

Figure 4:
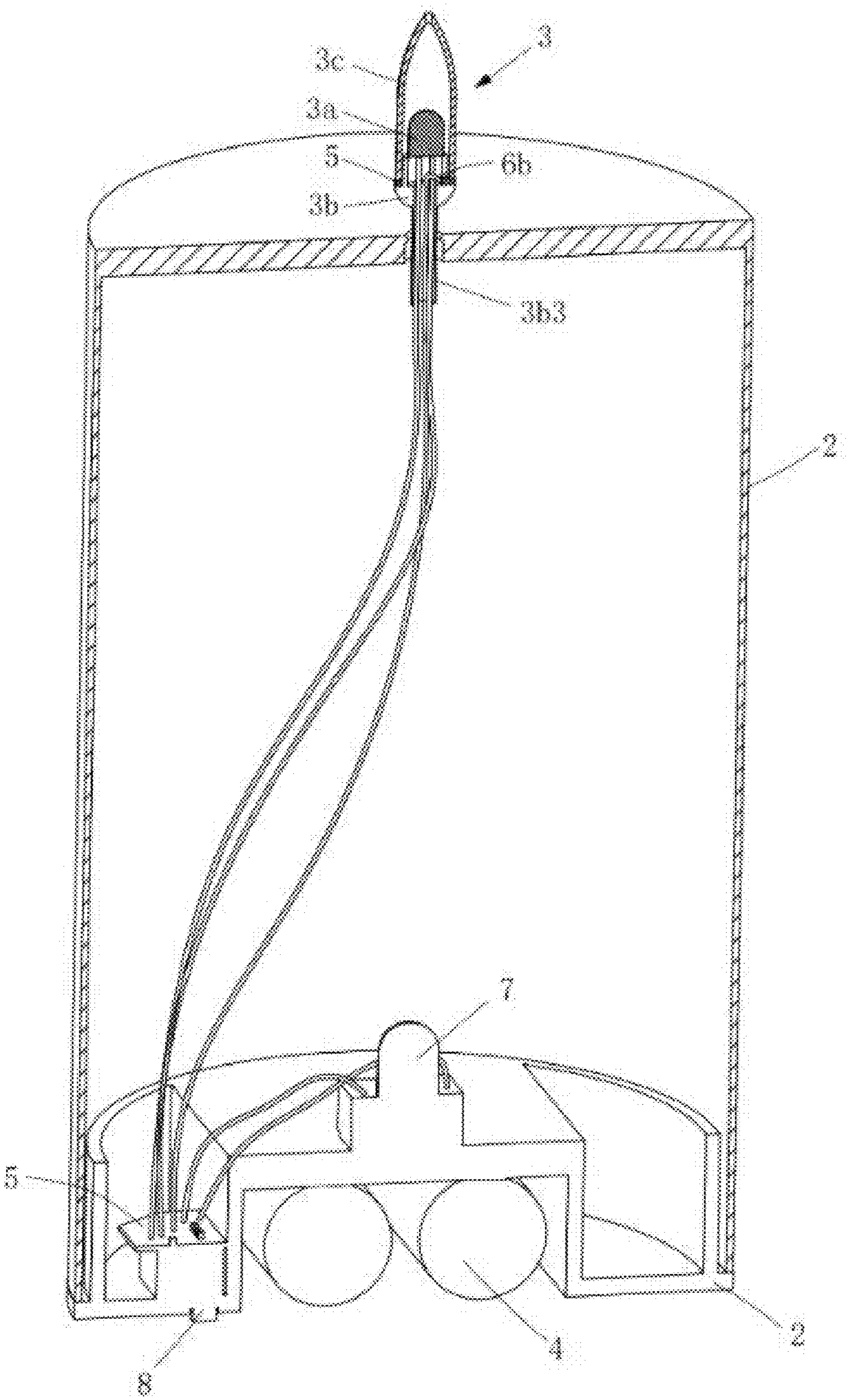
FIG. 4 is a schematic sectional view of the present invention.

In order to facilitate the installation of the touch switch 6 on the connecting sleeve 3*b*, refer to FIG. 4. In this embodiment, the touch switch 6 is designed in an annular structure, and a step surface 3*b*1 adapted to the bottom of the touch switch 6 is formed on the outer peripheral surface of the connecting sleeve 3*b*. And the touch switch 6 is sleeved on the outer peripheral side of the connecting sleeve 3*b* with the bottom attached to the step surface 3*b*1. The touch switch 6 can be firmly fixed to the connecting sleeve 3*b* through the mutual adaptation of the step surface 3*b*1 and the touch switch 6.

In other embodiments (not shown), the shape of the touch switch 6 is not limited to the ring structure, but can be adjusted according to the shape and layout requirements of the connecting sleeve 3*b*, as well as the installation space and functional requirements of the touch switch 6, for example, it can be replaced by a rectangular, circular, elliptical or other polygonal structure.

In other embodiments (not shown), the step surface **3*b*1 can be replaced by a groove, a flange, a card slot or other types of positioning structures to provide a stable connection with the bottom or other parts of the touch switch 6. In addition to the mutual adaptation between the step surface 3*b*1 and the bottom of the touch switch 6**, other fixing methods such as mechanical buckle, spring clip or magnetic adsorption can be used.

Moreover, in order to connect the touch switch 6 and the PCB board 5 with the conductive wire **6*b* conveniently, and at the same time, the touch switch 6 can be positioned on the connecting sleeve 3*b* in the circumferential direction, in this embodiment, the inner side wall of the touch switch 6 extends inward to form a connecting part 6*a*. Correspondingly, the connecting sleeve 3*b* is further provided with a placing groove 3*b*2 which can accommodate the connecting portion 6*a*. The touch switch 6 is provided with a wire 6*b*, one end of which is connected to the connecting part 6*a*, and the other end of the wire 6*b* extends downward through the connecting sleeve 3*b* and is connected to the PCB board 5**.

In this embodiment, the touch switch 6, the first luminous body **3*a*, the battery 4 and the PCB board 5 are electrically connected together to form a control loop. Therefore, by touching the touch switch 6, it is possible to control the turn-on or turn-off of the first luminous body 3*a***.

By providing the placing groove **3*b*2, when the touch switch 6 is installed, the connecting portion 6*a* can be inserted into the placing groove 3*b*2, so that the connecting portion 6*a* can be accommodated. In addition, the circumferential positioning and limiting of the touch switch 6 can be realized through the engagement between the connecting part 6*a* and the placing groove 3*b*2, so that the touch switch 6 will not move around the connecting sleeve 3*b***.

In other embodiments (not shown), in addition to realizing circumferential positioning through the connecting part **6*a* and the placing groove 3*b*2, additional positioning structures, such as pin insertion or screw insertion, can be added to the touch switch 6, which can improve the stability and accuracy of the installation of the touch switch 6 on the connecting sleeve 3*b* and reduce the stress on the connecting part 6*a***.

In addition, in order to keep the first luminous body **3*a* from being exposed, and to simulate the real flame effect, referring to FIG. 1, in this embodiment, the simulated hood 3*c* is made in the shape of a flame, the simulated hood 3*c* is sleeved on the outer peripheral side of the connecting sleeve 3*b*, and the bottom is pressed on the top of the touch switch 6, and the outer peripheral wall of the touch switch 6 can be exposed between the simulated hood 3*c* and the connecting sleeve 3*b*, so that the exposure of the outer peripheral wall of the touch switch 6** can be more conveniently controlled by the user through finger touch.

In this embodiment, when the electronic candle is used, it is only necessary to touch the touch switch 6 with a finger to control the opening or closing of the first luminous body **3*a*, so as not to touch the wax on the surface of the outer shell 2**.

In other embodiments (not shown), the shape of the simulated hood **3*c* is not limited to the flame shape, and the shape of the simulated hood 3*c* can also be replaced with other shapes similar to the flame or having similar visual effects, such as waves, irregular curved surfaces, multi-layered folds and other shapes, as long as they can effectively shield the first luminous body 3*a* and produce the required visual effects. Of course, the simulated hood 3*c*** can be made of transparent or translucent materials, and the flame texture pattern or light and shadow effect can be embedded in the material to simulate the flame more realistically.

Figure 5:
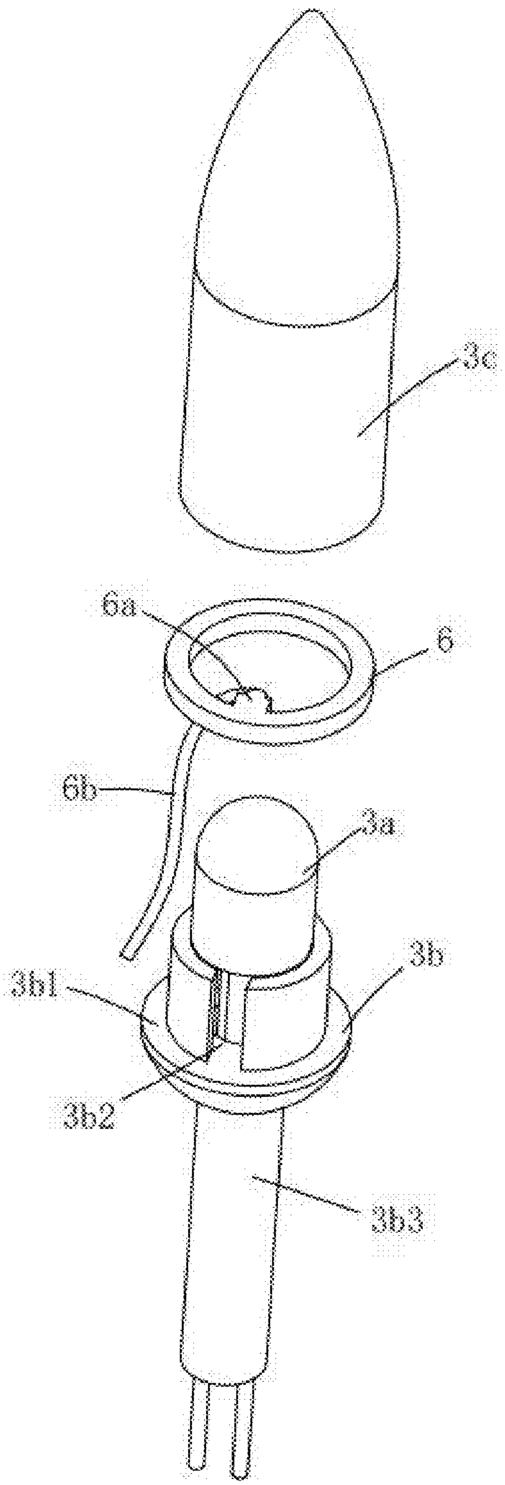
FIG. 5 is a schematic diagram of the exploded structure of the simulated flame head in the present invention.
Figure 6:
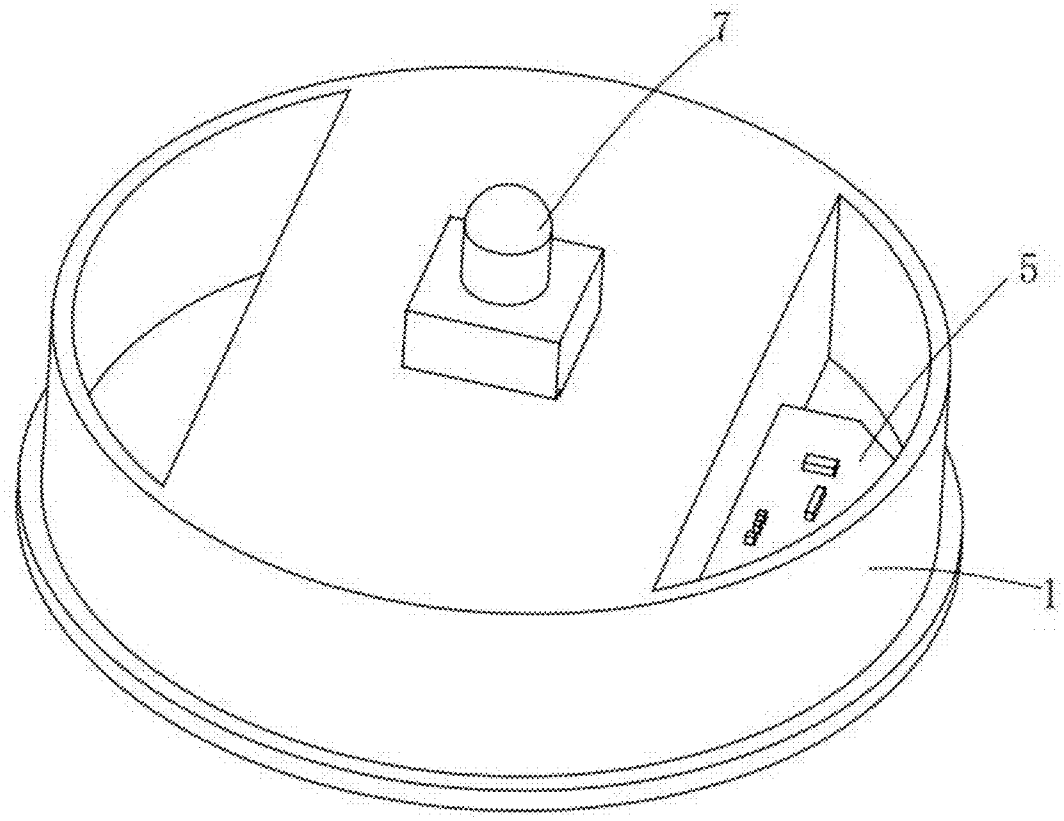
FIG. 6 is a schematic diagram of the three-dimensional structure of the base in the present invention.

In order to light up the bottom of the outer shell 2, so as to simulate a more realistic scene, referring to FIGS. 3 and 5, in this embodiment, the base 1 is further provided with a second luminous body 7, which is built in the outer shell 2 and electrically connected to the power supply 4, the PCB board 5 and the touch switch 6. Therefore, the touch switch 6, the first luminous body **3*a*, the second luminous body 7, the battery 4 and the PCB board 5 are electrically connected together to form a control loop, so that the first luminous body 3*a* and the second luminous body 7 can be simultaneously lit by controlling the touch switch 6**.

The types of the first luminous body **3*a* and the second luminous body 7** can be replaced according to the required lighting effect and power consumption. For example, LED lamps or other light emitting elements can be used to replace the current luminous bodies. If it is necessary to simulate the flame of a specific color or other light source effects, you can choose a luminous body with corresponding color or color-changing function, such as a strip LED lamp with changeable colors, or an LED lamp with a flame shape.

In other embodiments, the first luminous body **3*a* or the second luminous body 7 can also be individually switched on and off and adjusted in color by touching the switch 6. For example, touching the touch switch 6 once is to switch the first light 3*a* or adjust the color, while touching the touch switch 6 twice continuously is to switch the second light 7** or adjust the color.

Moreover, the present invention is not limited to setting the first luminous body **3*a* and the second luminous body 7. In other embodiments, in order to increase the realistic effect of the electronic candle, luminous bodies such as LED bulbs, light strips, light strings and the like can be added at any other suitable position. Moreover, the newly added luminous body can also be controlled by the touch switch 6 and the toggle switch 8**, or the color can be adjusted.

As shown in FIG. 2 and FIG. 3, in order to make the whole electronic candle more safely controlled, in this embodiment, a toggle switch 8 is additionally arranged at the bottom of the base 1, and the toggle switch 8, the first luminous body **3*a*, the second luminous body 7, the power supply 4 and the PCB board 5 are electrically connected together to form a control loop. By controlling the toggle switch 8, the whole circuit can be controlled on and off, and when the electronic candle is not used for a long time, the power supply can be cut off by controlling the toggle switch 8, so as to avoid the inadvertent opening of the electronic candle caused by the accidental touch of the exposed touch switch 5**, thus realizing the dual control mode.

In other embodiments, the toggle switch 8 can be replaced by a rotary switch, a sliding switch, a touch switch and other switches with the same function, so as to provide different operation modes and increase the diversity of products.

In other embodiments (not shown), the toggle switch 8 can also be installed on the side of the base 1 according to the actual situation, so that the toggle switch 8 can be operated without picking up the electronic candle when operating, which makes the operation of the toggle switch 8 more convenient.

In this embodiment, a plurality of batteries 4 are connected in series in a horizontal side-by-side manner, and as shown in FIG. 4, the installation mode of the batteries 4 is suitable for electronic candles with larger diameters. In other embodiments (not shown, a plurality of batteries 4 are also connected in series in a way that they can be connected up and down. This installation mode is applicable to a slender electronic candle, so that the electronic candle can be applied to different scenes.

In other embodiments (not shown), the inner surface of the outer shell 2 can be additionally provided with a colorless and transparent hard inner wall made of acrylic, glass or hard plastic, which can enhance the structural strength of the outer shell 2 and make the outer shell 2 not easy to be broken.

In other embodiments (not shown in the figure), the battery 4 can be a rechargeable lithium battery or a lithium-ion battery or a nickel-hydrogen battery. Both of these power supplies can supply power for a long time, which is suitable for devices that need continuous operation or high brightness. At the same time, they can be charged through USB or other charging interfaces, reducing the frequency and cost of battery replacement.

And in other embodiments (not shown), wireless communication functions can be added to the PCB board 5, such as adding Bluetooth, Wi-Fi or other wireless communication modules, so that the electronic candle device can communicate and control with other intelligent devices (such as mobile phones), and the control of the electronic candle is more convenient and quick.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can", "could", "might", "may", "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising", "including", "having" and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An electronic candle with a dual-control mode, comprising a base, an outer shell and a simulated flame head with a first luminous body, wherein the outer shell is arranged on the base, the simulated flame head is exposed at a top of the outer shell, and a battery capable of supplying power to the first luminous body and a PCB board for control are arranged on the base;

the simulated flame head is provided with a touch switch exposed for people to touch, and the touch switch, the first luminous body, the battery and the PCB board are electrically connected together to form a first control loop; and whether the first luminous body of the simulated flame head emits light or not is controlled by touching the touch switch; and the base is further provided with a second luminous body, and the second luminous body is placed in the outer shell and electrically connected with the battery, the PCB board and the touch switch to form a second control loop.

2. The electronic candle with a dual-control mode according to claim 1, wherein the simulated flame head comprises a connecting sleeve and a wire conduit, the connecting sleeve is connected to the outer shell through the wire conduit, and the first luminous body and the touch switch are both arranged on the connecting sleeve.

3. The electronic candle with a dual-control mode according to claim 2, wherein the touch switch has an annular structure, a step surface adapted to a bottom of the touch switch is formed on an outer peripheral surface of the connecting sleeve, and the touch switch is sleeved on an outer peripheral side of the connecting sleeve with the bottom attached to the step surface.

4. The electronic candle with a dual-control mode according to claim 2, wherein an inner side wall of the touch switch extends inward to form a connecting part, and the connecting sleeve is provided with a placing groove for accommodating the connecting part.

5. The electronic candle with a dual-control mode according to claim 4, wherein the touch switch is provided with a wire, one end of which is connected to the connecting part, and the other end of which extends downward through the connecting sleeve and is connected to the PCB board.

6. The electronic candle with a dual-control mode according to claim 2, wherein the simulated flame head further comprises a simulated hood surrounding the first luminous body, the simulated hood is sleeved on the outer peripheral side of the connecting sleeve with a bottom thereof being pressed on the top of the touch switch, and an outer peripheral wall of the touch switch is exposed between the simulated hood and the connecting sleeve.

7. The electronic candle with a dual-control mode according to claim 1, wherein a toggle switch is additionally arranged at a bottom of the base; the toggle switch, the first luminous body, the second luminous body, the battery and the PCB board are electrically connected together to form the second control loop, and the on-off of a entire circuit is realized by controlling the toggle switch.

8. An electronic candle with a dual-control modes, comprising a base, an outer shell and a simulated flame head, wherein:

a first luminous body is arranged in the simulated flame head, and a second luminous body located in the outer shell is also arranged on the base; and wherein an exposed touch switch is arranged on the simulated flame head, and the touch switch is touched by people and controls whether the first luminous body and the second luminous body emit light or not; and the base is provided with a toggle switch, and the toggle switch controls the on-off of the circuit of the touch switch, the first luminous body and the second luminous body.

9. The electronic candle with a dual-control mode according to claim 8, wherein the outer shell is arranged on the base, and the base is provided with a battery capable of supplying power to the first luminous body and the second luminous body and a PCB board for control.

10. The electronic candle with a dual-control mode according to claim 9, wherein the touch switch, the first luminous body, the second luminous body, the battery and the PCB board are electrically connected together to form a control loop.

11. The electronic candle with a dual-control mode according to claim 9, wherein the toggle switch, the first luminous body, the second luminous body, the battery and the PCB board are electrically connected together to form a control loop, and the on-off of the entire circuit is realized by controlling the toggle switch.

12. An electronic candle with a dual-control mode, comprising a base, an outer shell and a simulated flame head, wherein:

the simulated flame head comprises a first luminous body, a connecting sleeve, a simulated hood and a touch switch, wherein the touch switch controls whether the first luminous body emits light or not; and wherein the first luminous body and the touch switch are both arranged on the connecting sleeve, the simulated hood is sleeved on the connecting sleeve and surrounds the outside of the first luminous body, and a peripheral wall of the touch switch is exposed between the simulated hood and the connecting sleeve;

wherein an inner side wall of the touch switch extends inward to form a connecting part, and the connecting sleeve is provided with a placing groove for accommodating the connecting part and is used for circumferential positioning and limiting of the touch switch;

wherein the outer shell is arranged on the base, and the base is provided with a battery capable of supplying power to the first luminous body and a PCB board for control; and wherein the base is further provided with a second luminous body, the second luminous body is placed in the outer shell and electrically connected with the battery, and the PCB board and the touch switch to form a control loop.

13. The electronic candle with a dual-control mode according to claim 12, wherein the touch switch, the first luminous body, the battery and the PCB board are electrically connected together to form a control loop.

14. The electronic candle with a dual-control mode according to claim 12, wherein the touch switch has an annular structure, a step surface matched with a bottom of the touch switch is formed on an outer peripheral surface of the connecting sleeve, and the touch switch is arranged on an outer peripheral side of the connecting sleeve with the bottom attached to the step surface.

15. The electronic candle with a dual-control mode according to claim 12, wherein a toggle switch is additionally arranged at the bottom of the base; the toggle switch, the first luminous body, the second luminous body, the battery and the PCB board are electrically connected together to form the control loop, and the on-off of the entire circuit is realized by controlling the toggle switch.

* * * * *